United States Patent
Youn

(10) Patent No.: US 6,697,495 B1
(45) Date of Patent: Feb. 24, 2004

(54) PORTABLE COMPUTER SPEAKER ASSEMBLY

(75) Inventor: Jae-Sam Youn, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/451,934

(22) Filed: Dec. 1, 1999

(30) Foreign Application Priority Data

Dec. 1, 1998 (KR) .............................. 98-24245

(51) Int. Cl.$^7$ ................................. H04R 1/02
(52) U.S. Cl. ...................... 381/333; 381/374; 381/388; 381/395; 381/306
(58) Field of Search ................. 381/333, 332, 381/384, 374, 386, 395, 383; 386/97; 361/680, 6, 83; 16/368; 358/254

(56) References Cited

U.S. PATENT DOCUMENTS

| | | | | |
|---|---|---|---|---|
| 4,272,791 A | * | 6/1981 | Rifken | 380/208 |
| 4,633,323 A | * | 12/1986 | Haberkern et al. | 348/838 |
| 4,864,523 A | * | 9/1989 | Sasaki | 361/680 |
| 5,214,514 A | * | 5/1993 | Haberkern | 386/97 |
| 5,448,446 A | * | 9/1995 | Honda et al. | 361/680 |
| 5,481,616 A | | 1/1996 | Freadman | |
| 5,550,921 A | | 8/1996 | Freadman | |
| 5,604,663 A | | 2/1997 | Shin et al. | |
| 5,608,809 A | * | 3/1997 | Ueda | 381/384 |
| 5,610,992 A | | 3/1997 | Hickman | |
| 5,638,456 A | | 6/1997 | Conley et al. | |
| 5,646,820 A | | 7/1997 | Honda et al. | |
| 5,647,007 A | * | 7/1997 | Wooderson et al. | 381/332 |
| 5,666,694 A | * | 9/1997 | Slow et al. | 16/368 |
| 5,668,882 A | | 9/1997 | Hickman et al. | |
| 5,682,290 A | | 10/1997 | Markow et al. | |
| 5,708,561 A | | 1/1998 | Huilgol et al. | |
| 5,715,139 A | | 2/1998 | Nakajima | |
| 5,732,140 A | | 3/1998 | Thayer | |
| 5,761,322 A | | 6/1998 | Illingworth et al. | |
| 5,796,854 A | | 8/1998 | Markow | |
| 5,805,708 A | | 9/1998 | Freadman | |
| 5,838,537 A | | 11/1998 | Lundgren et al. | |
| 5,852,545 A | | 12/1998 | Pan-Ratzlaff | |
| 6,233,344 B1 | * | 5/2001 | Clegg et al. | 381/374 |

\* cited by examiner

*Primary Examiner*—Xu Mei
*Assistant Examiner*—Andrew Graham
(74) *Attorney, Agent, or Firm*—Robert E. Bushnell, Esq.

(57) ABSTRACT

The present invention relates to a compact audio speaker assembly for a portable computer. The portable computer has a lower housing having a first opening on a side surface, a upper housing having a second opening corresponding to the first opening and coupled to the lower housing to form an internal space, and a speaker assembly installed in the internal space and held by the lower housing and the upper housing. An end surface of the speaker assembly is exposed outwardly through the first opening and the second opening.

17 Claims, 8 Drawing Sheets

PORTABLE COMPUTER SPEAKER ASSEMBLY

CLAIM OF PRIORITY

This application makes reference to, incorporates the same herein, and claims all benefits accruing under 35 U.S.C. §119 from an application entitled Portable Computer Speaker Assembly earlier filed in the Korean Industrial Property Office on Dec. 1, 1998, and there duly assigned Ser. No. 98-24245 by that Office.

FIELD OF THE INVENTION

The present invention relates to a portable computer and, more particularly to a compact audio speaker assembly for the portable computer.

BACKGROUND OF THE INVENTION

Beginning in the mid-1980's, portable computers, alternately known as either laptops or notebook computers, have expanded in popularity and at an astonishing rate. Such computers are lightweight and have a display screen supported by a hinged cover that protects the keyboard and display screen when the computer is not being operated. Recent portable computers generally have multi-media elements such as a CD-ROM (Compact Disc player with Read Only Memory), sound cards for processing high resolution sound, microphone for audio input, and the acoustic output from speakers. The sound from these speakers are usually at least in stereo and sometimes better definition. These particular portable computers are sometimes called Multimedia portable computer systems. The standards for multimedia computers were defined in relation to desktop computers, and do not directly take into account the format of a portable computer such as the reduced size and limitations on the power supply. There are many methods of installing a speaker in a portable computer, but generally the speaker is inserted into a rib or gasket of a portable computer.

It is very difficult to implement speakers in a small portable computer. An exemplar of the prior art Freadman (U.S. Pat. No. 5,481,616, Plug-in Sound Accessory for Portable Computers, January 1996) discloses a portable computer equipped with sound capability by plugging a personal computer memory card international association (PCMCIA) card having an on-board master speaker module into a PCMCIA slot.

Freadman (U.S. Pat. No. 5,550,921, Stereo Sound for Portable Computer, August 1996) discloses a dual-speaker unit providing improved stereo base response and directionality for portable computer applications.

Shin et al. (U.S. Pat. No. 5,604,663, Portable Computer Docking Station having a Rotatable Member and Audio Speakers Mounted on the Rotatable Member, February 1997) discloses a portable computer docking station having a rotatable member and audio members mounted on the rotatable member. Hickman (U.S. Pat. No. 5,610,992, Portable Electronic Device Having Ported Speaker Enclosure, March, 1997) discloses a portable computer having a ported speaker enclosure. The ported speaker enclosure has a speaker having a front portion and a back portion. Honda et al. (U.S. Pat. No. 5,646,820, Portable Computer having a Case which contains a Speaker in a Front Wall and a Keyboard in an Upper Wall, July 1997) discloses a portable computer having a case which contains a speaker in a front wall and a keyboard in an upper wall. Hickman et al. (U.S. Pat. No. 5,610,882, Notebook Computer Speakers, September 1997) discloses a loudspeaker configuration for a notebook computer including one or more high frequency upper speakers and a low frequency lower speaker.

Huilgol et al. (U.S. Pat. No. 5,708,561, Portable Computer Having Display Slidably and Rotatably Mountedfor Movement Between Landscape and Portrait Orientation and to Open and Close Speaker Ports, January 1998) discloses a portable computer having a display slidably and rotatably mounted for movement between landscape and portrait orientation and to open and close speaker ports. The speaker ports are opened and closed when a cover moves.

Illingworth et al. (U.S. Pat. No. 5,761,322, Portable Computer Speaker Enclosure, June 1998) discloses a portable computer system including sealed acoustic suspension speaker enclosures which are each molded of a high density and a low density polymer combination.

Markow (U.S. Pat. No. 5,796,554, Thin Film Speaker Apparatus for Use in A Thin Film Video Monitor Device, August 1998) discloses a speaker system that is included in a thin film video monitor apparatus like a laptop. Multiple piezo transducers are placed in the walls of the display cover.

Lundgren et al. (U.S. Pat. No. 5,838,537, Retractable Speakers for Portable Computer, November 1998) discloses a retractable speakers for portable computer. This allows for the sound quality to be occasionally adjusted depending on the user's preference.

Pan-Ratzlaff ((U.S. Pat. No. 5,852,545, Detachable Electrical and Mechanical Mounting Mechanism for Snap Mounting Computer Speakers, December 1998) discloses a detachable electrical and mechanical mounting mechanism for snap mounting computer speakers.Markow et al. (U.S. Pat. No. 5,682,290, Portable Computer Having Loudspeakers in Enclosures formed by Gaskets Located Between a Keyboard, a Printed Circuit Board, and a Frame, October 1998) discloses a portable computer system having a loudspeaker enclosure defined by a printed circuit board, a keyboard section cover and a gasket.

Conley et al. (U.S. Pat. No. 5,638,456, Piezo Speaker and Installation Method for Laptop Personal Computer and Other Multimedia Applications, June 1997) discloses several implementations of a piezo speaker in a portable computer. Freadman (U.S. Pat. No. 5,805,708, Speaker System for Computer, September 1998) discloses a speaker system in a portable computer system with one part inside the computer and two ports emitting sound to the exterior. Nakajima (U.S. Pat. No. 5,715,139, Portable Electronic Apparatus having a Frame Supporting Functional Components, and Method of Assembling the Portable Electronic Apparatus, February 1998) discloses a base unit of a portable computer that houses speakers. Thayer (U.S. Pat. No. 5,732,140, Accoustic Speaker with Expandable Speaker Enclosure, March 1998) discloses a speaker system for a portable computer that has the speakers emitting sounds just above the keyboard or on the display panel.

The exemplar art do not have the housing for a small speaker that can also give multi-media type quality sound and be rapidly assembled without additional tools.

SUMMARY OF THE INVENTION

It is therefore an object of the present invention to provide a compact audio speaker assembly for a portable computer capable of being rapidly assembled into a portable computer without an additional tool. Not using a tool may reduce the possible damage of expensive housing parts of a portable computer during assembly.

It is also an object to provide a good location for the assembly of a speaker so that sounds from the speaker can be properly heard by the user.

It is another object to save space in a portable computer when implementing a sound system.

It is a further object to have a speaker system that is installed in the portable computer to generate high quality sound waves.

Another object is to have a speaker system so placed that it does not inhibit the user from using the keyboard and pointing device or inhibiting the sound quality while using such devices.

In order to attain the above objects, according to an aspect of the present invention, there is provided a portable computer having a lower housing with a first opening on a side surface, an upper housing having a second opening corresponding to the first opening and coupled to the lower housing to form an internal space. A speaker assembly is disposed in the internal space and held by the lower housing and the upper housing. One end surface of the speaker assembly is exposed outwardly through the first opening and the second opening.

In the portable computer according to the invention, the speaker assembly has a speaker, a first cap made of elastic material coupled to the speaker, and a second cap incorporating the first cap. The second cap has multiple holes on one end surface to allow sounds to emit outwardly from the speaker. The periphery of the second cap is held by the upper housing and the lower housing.

The second cap includes a first periphery having a first diameter which is disposed at the first opening and the second opening to be held by the surface of the upper housing and the lower housing. A second periphery has a second diameter larger than the first diameter which tightly contacts with internal surfaces of the upper housing and the lower housing.

The portable computer includes at least one rib formed in an internal space of the upper housing and the lower housing to support the speaker assembly.

According to another aspect of this invention, a portable computer has a base having a hinge portion at a rear edge. A display panel incorporating a display screen is attached pivotally to the hinge portion of the base. A speaker assembly is coupled in the hinge portion. A sound-emitting portion of the speaker assembly is disposed at the side surface of the hinge portion.

BRIEF DESCRIPTION OF THE INVENTION

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
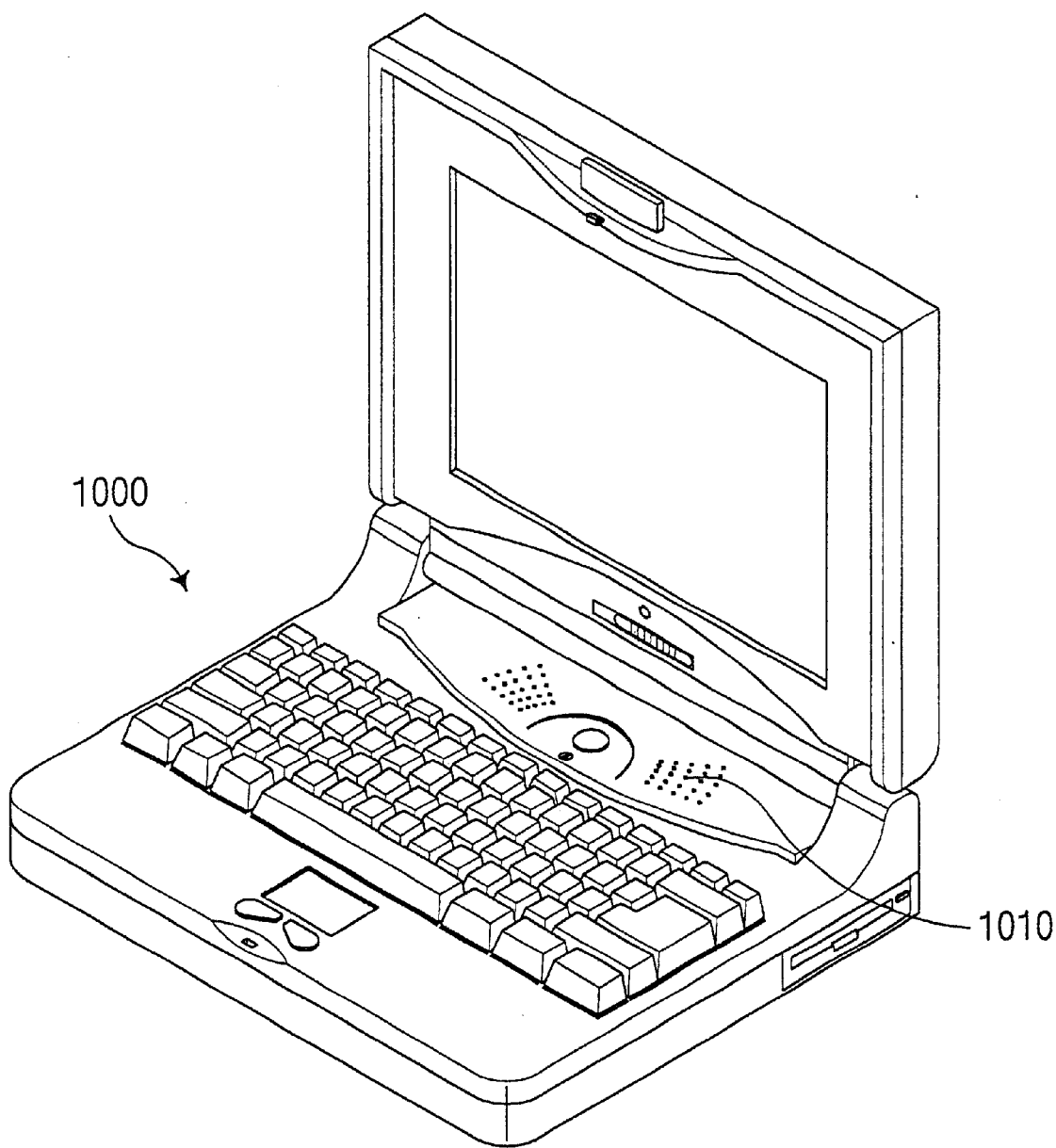
FIG. 1 is a perspective view of a portable computer incorporating a speaker.
Figure 2:
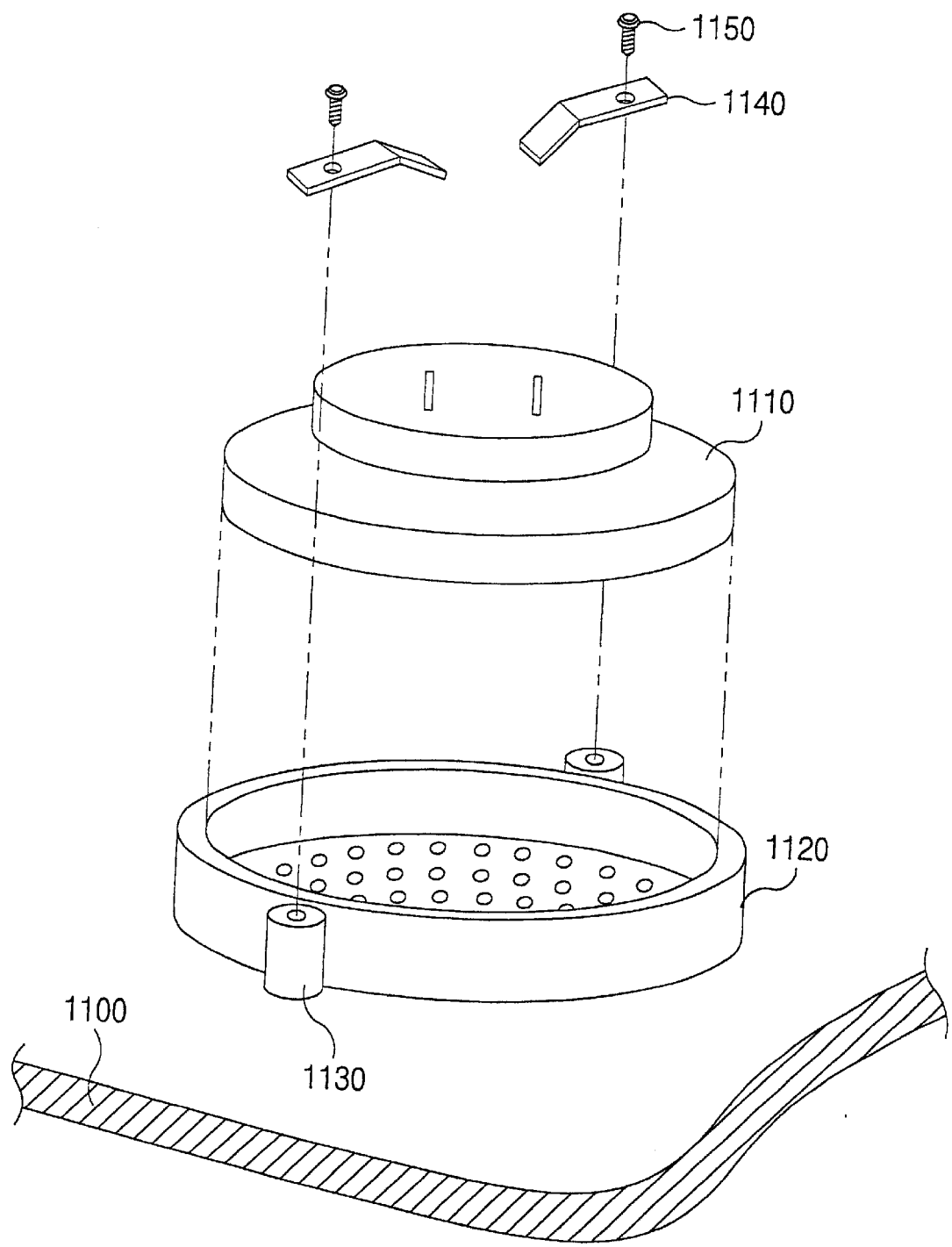
FIG. 2 is an exploded perspective view for illustrating the way to couple the speaker to the portable computer.

Referring to FIGS. 1 and 2, the speaker 1110 is mounted on an internal surface of the upper housing 1100 of the portable computer 1000. At first, the general speaker 1110 is inserted into a rib 1120 formed on the internal surface of the upper housing 1100, and two fixing-plates 1140 support the conventional speaker 1110 through two screws 11150 spaced apart and joined to two bosses 1130. In this manner, the conventional speaker 1110 is securely coupled to the upper housing 1100. Then sound waves generated at the conventional speaker 1110 can be emitted through a pair of grills 1010 having a plurality of holes. The grill 1010 may have various forms for aesthetic purposes such an implementation method, many problems occur during assembly. For example, incorrectly fastening with screws causes the speaker not to be leveled. The improperly leveled speaker causes the generation of low quality and obscure sound waves. Additionally, the joining method using screws needs an additional tool for a combination or separation. The use of the tool may damage the boss during assembly, resulting in the expensive proposition of having to change the whole housing to mount the speaker.

Figure 3:
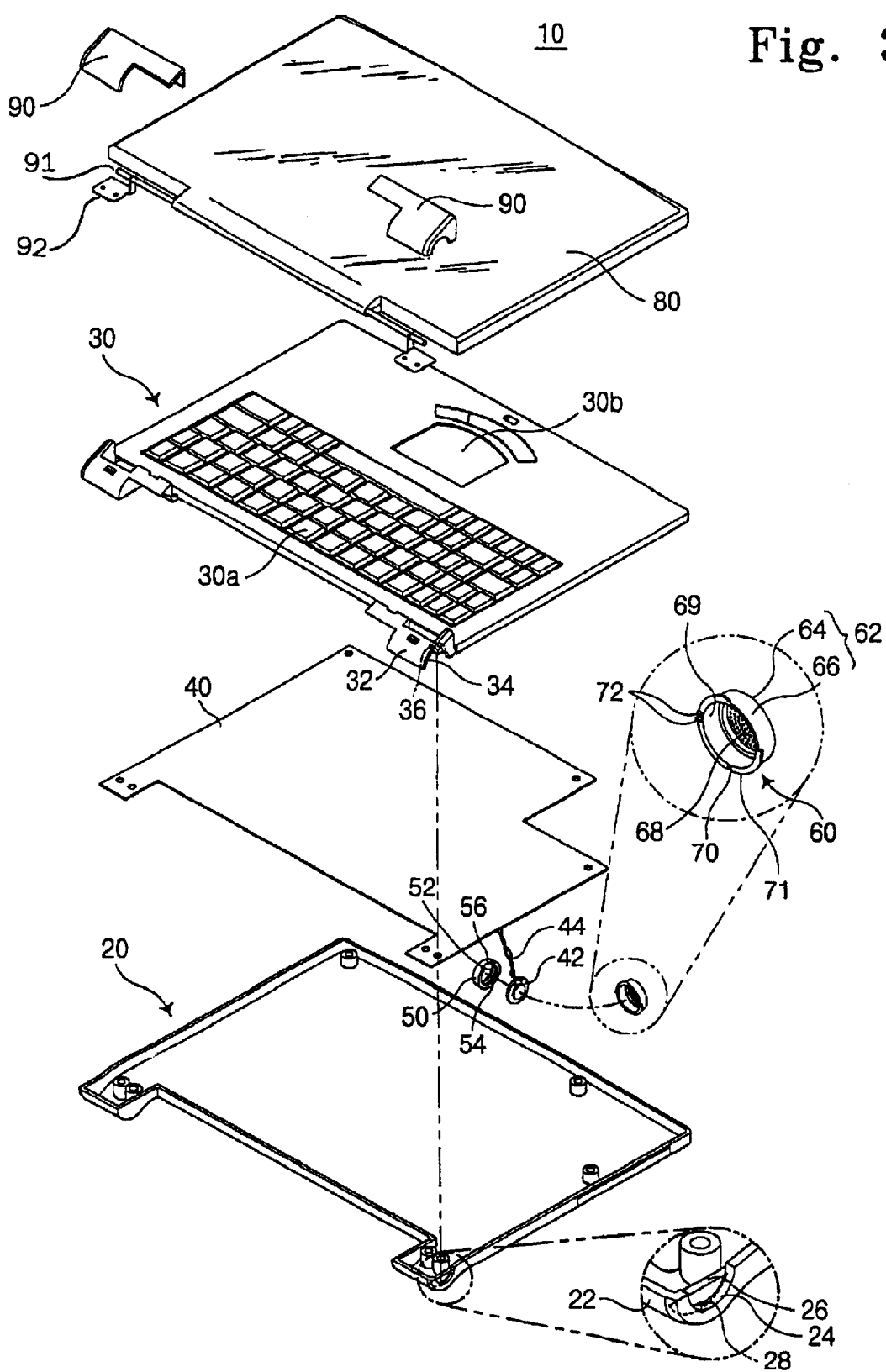
FIG. 3 is an exploded perspective view of the portable computer provided with a speaker assembly according to an embodiment of a present invention.
Figure 4:
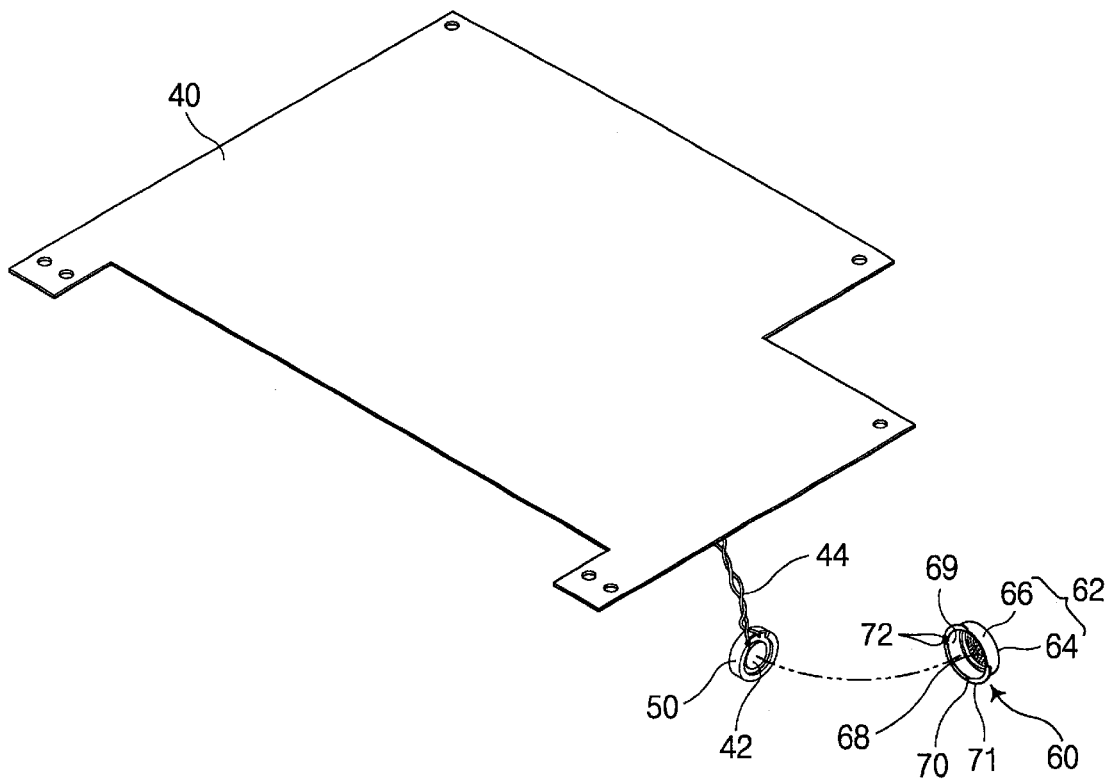
FIG. 4–7 are assembled views of the speaker assembly according to the embodiment of the present invention.
Figure 5:
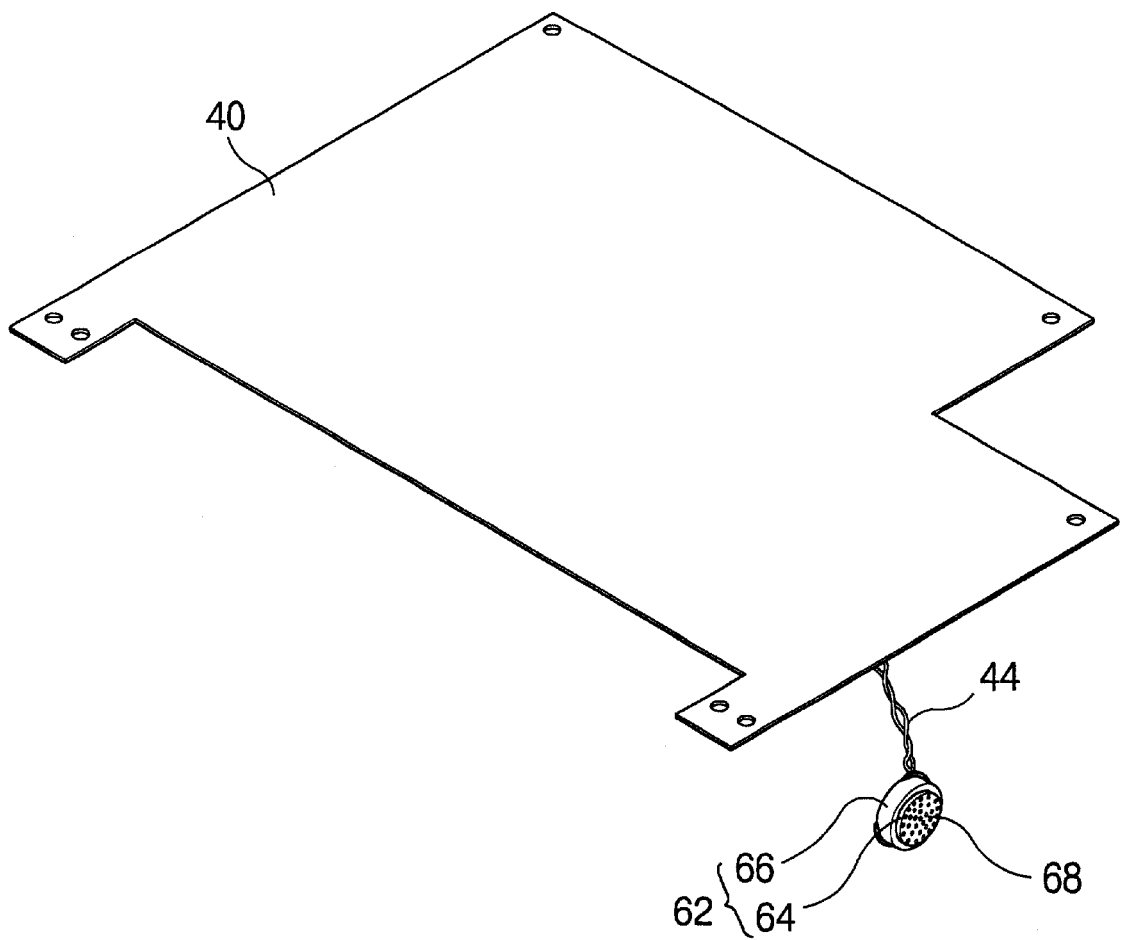
Figure 6:
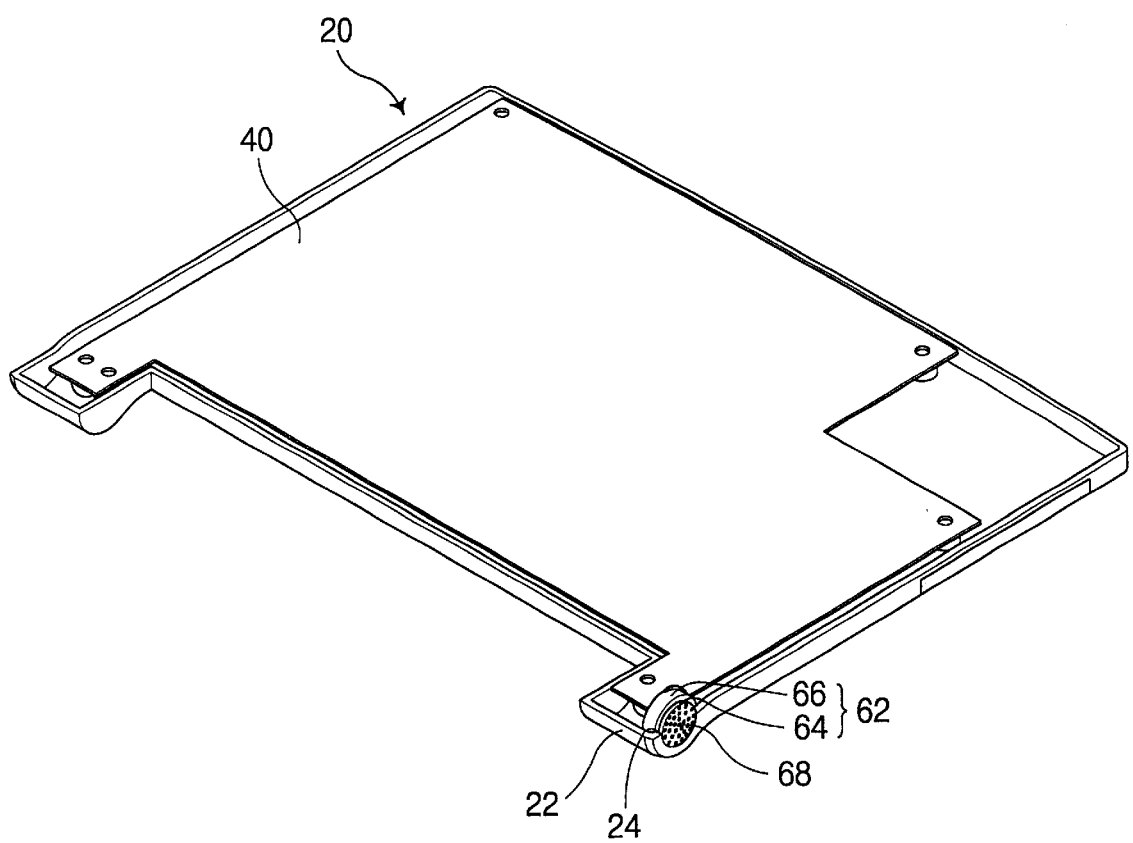
Figure 7:
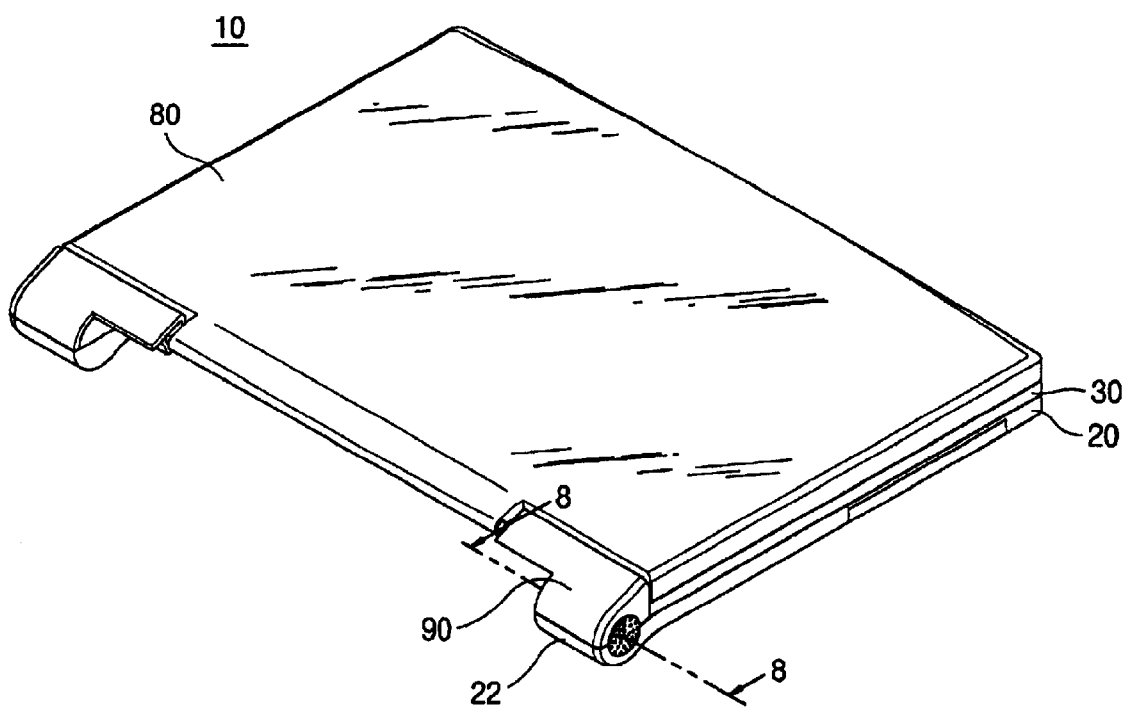

One embodiment of the present invention discloses a portable computer incorporating a speaker assembly of the present invention. Referring to FIG. 3, the portable computer incorporating the speaker assembly includes a lower (or bottom) housing 20, a upper (or top) housing 30 and a speaker assembly. The portable computer 10 includes a display screen housing 80, the upper housing 30, the lower housing 20 and a main processor board (or PCB or circuit board) 40. The upper housing 30 and the lower housing 20 are often called the base of the portable computer 10. The display screen housing 80 is pivotally attached to the upper housing 30 incorporating a keyboard 30a. When the upper housing 30 and the lower housing 20 is coupled, the main processor board 40 is mounted on the lower housing 20 and receives inputs from the keyboard 30a and a pointing device 30b. The processor board 40 generates outputs to a display screen (not shown) of display screen housing 80. A pair of caps 90 are coupled to cover with hinge portions 22, 32 and a hinge (pivot) shaft 91 at a rear side of the display screen housing 80. The hinge shaft 91 is inserted through the hinge plates 92. A first hinge portion 22 is formed on a rear side of the lower housing 20 and a second hinge portion 32 is formed on a rear side of the upper housing 30 opposite to the first hinge portion 22. In a side wall of the first hinge portion 22 and the second hinge portion 32, openings having semi-circular form 24, 34 are formed and when an upper opening 34 and a lower opening 24 is coupled, a complete circular form is obtained. Ribs 26, 36 are individually formed on each of the housing 20, 30 adjacent to the openings 24, 34. Additionally, a projection 28 is formed on the lower housing 20 to support the speaker 42.

The speaker 42 is connected with the processor board 40 through a cable 44, and the speaker 42 is gradually combined with a first cap (sleeve) 50 and a second cap 60. The first cap 50 is made of elastic materials, such as rubber, and includes an opening 54, an internal groove 52 and a concave surface of periphery 56. Through the opening 54, the speaker 42 is coupled to the first cap 50 and the periphery of the speaker 42 is held by the internal groove 52 of the first cap 50. The cable 44 is disposed at the concave surface 56 to be free between the gap of the first cap 50 and the speaker 42.

Due to the elasticity of the first cap 50, the combination is easily accomplished.

Next, the first cap 50 incorporating the speaker 42 is inserted into the second cap 60. An opening 69 is formed at a rear surface of the second cap 60 to receive the first cap 50, and the grill 68 having several holes is disposed at the front surface of the second cap 60. The outer periphery 62 is divided into two portion 64, 66. A first periphery surface 64 has a regular diameter corresponding to a diameter of the opening formed by the combination of the lower and upper housing 20, 30. The first periphery surface 64 is held by the outer surface of the lower and upper housing 20, 30. A second periphery surface 66, having a diameter larger than the regular diameter of the first periphery surface 64, is disposed at the internal space of the base when the speaker assembly is coupled to the upper housing 30 and the lower housing 20. The second cap 60 also includes a flange 71 having a notch 70 and a guiding rib 72. The guiding rib 72 is used for the cable 44 to be lined up orderly.

In a portable computer system, of course, there is very little volume available to any one component, so it is particularly important to balance the requirements of satisfactory audio reproduction and the need to keep the sound system as small as possible within the computer system.

Figure 8:
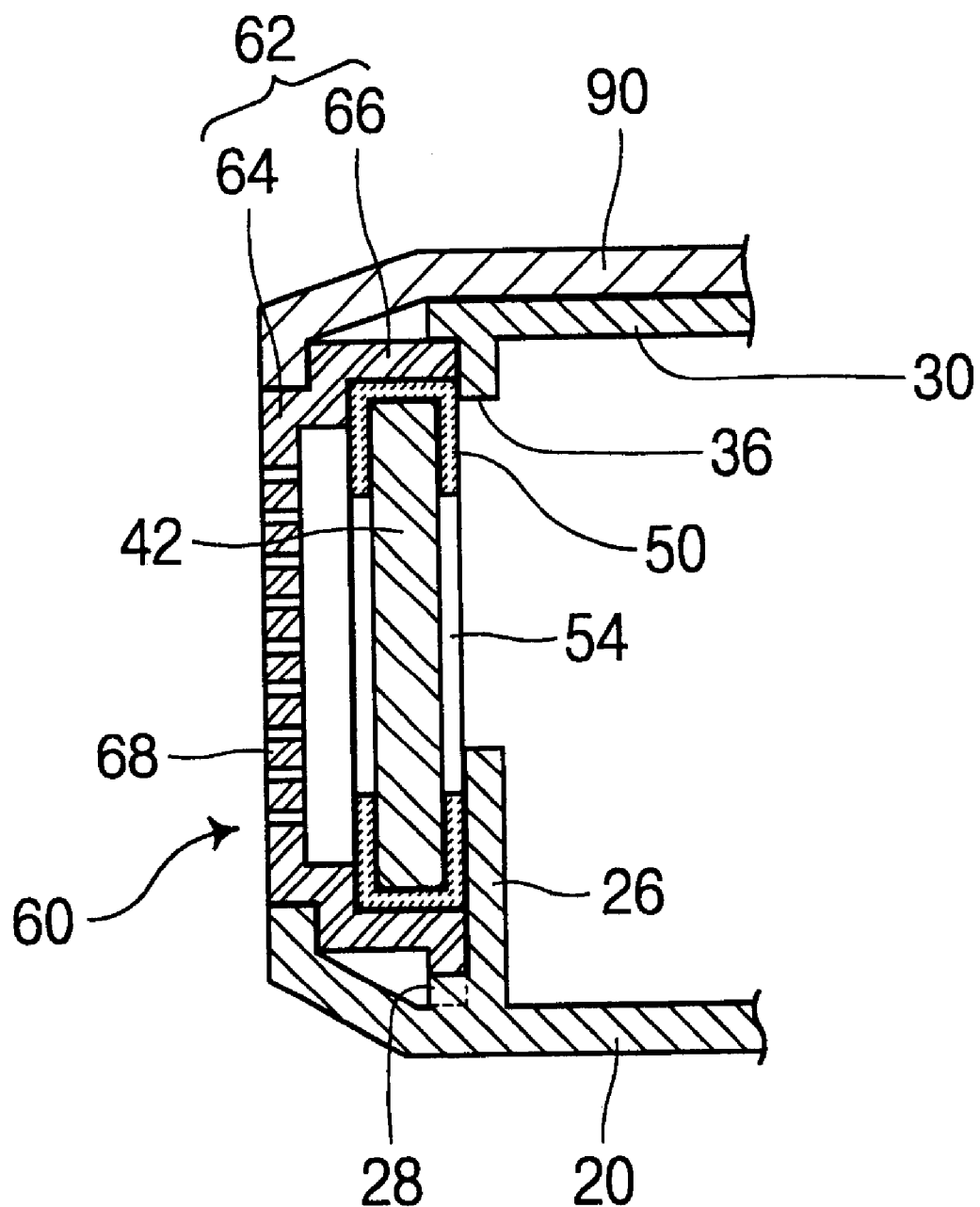
FIG. 8 is a cross-sectional view taken along a line 8—8 of FIG. 7.

Referring to FIGS. 4–8, at first, the speaker 42 is coupled to the first cap 50. Next, The first cap 50 incorporating the speaker 42 is inserted into the second cap 60 through the opening 69. The speaker assembly means the second cap 60 incorporating the first cap 50 having the speaker 42. Then such a speaker assembly is mounted on the lower housing 20. As shown in FIG. 8, the first periphery surface 64 of the second cap 60 is mounted on the surface of the lower housing 20 and held by the surface of the upper housing 30. The second periphery surface 66 of the second cap 60 is held by the internal shape of the housing, and the projection 28 is inserted into the notch 70, to fix the mounting state. Furthermore, the ribs 26, 36 securely support the rear surface of the speaker assembly. Using such a coupling manner, it is possible that coupling the speaker assembly to the housing is easily obtained.

A particular advantage of the disclosed speaker assembly is that it can be rapidly and easily assembled into a portable computer without an additional tool. Furthermore the disclosed speaker assembly is capable of generating high quality sound waves.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A portable computer, comprising:
   a bottom portion of a housing, said housing accommodating electronic components for performing functions of said portable computer;
   a first hinge portion forming on a rear side of said bottom portion, said first hinge portion having a semicircular opening on at least one side of said first hinge portion;
   a circuit board coupling with said bottom portion, said circuit board accommodating a microprocessor controlling functions of said portable computer;
   at least one speaker electrically connecting to said circuit board through a cable;
   a top portion of said housing coupling to said bottom portion, said top portion accommodating an input device and a pointing device for said portable computer;
   a second hinge portion forming on a rear side of said top portion, said second hinge portion having a semicircular opening on at least one side of said second hinge portion, said coupled first and second portions forming a circular opening from the coupled semicircular openings of said first and second hinge portions;
   a first cover pivotally attaching to said top portion at the second hinge portion, said first cover incorporating a display screen providing variable video display;
   two second covers encasing said second hinge portion, each one at opposite ends of said second hinge portion;
   a sleeve forming from a resilient material being coupled to said speaker, said sleeve with a portion of a periphery having a concave aperture, the concave aperture being a conduit for said cable of said speaker; and
   a cap having a first and second periphery coupled with said sleeve, said first periphery disposed to a front side of said cap and being held by the circular opening created by the coupled first and second hinge portions, said second periphery formed towards the rear of said cap having a diameter greater than said first periphery and being disposed at an internal space of the coupled said top and bottom portions of said housing, said cap having an opening at a rear surface and a plurality of holes disposed at the front surface allowing sound waves from said speaker to emit outwardly.

2. The portable computer of claim 1, wherein said cap has a flange formed at a rear edge, said flange has a notch and a pair of ribs formed around a periphery, said pair of ribs being parallel with a space guiding said cable of said speaker in a straight line.

3. The portable computer of claim 2, wherein said first hinge portion has a rib securely supporting a bottom rear surface of said speaker.

4. The portable computer of claim 3, wherein said second hinge portion has a rib supporting a top rear surface of said speaker.

5. The portable computer of claim 4, wherein the area of said first hinge portion forming the semicircular opening has a projection, said projection is inserted into said notch of said cap.

6. The portable computer of claim 4, wherein the area of said second hinge portion forming the semicircular opening has a projection, said projection is inserted into said notch of said cap.

7. The portable computer of claim 1, wherein the coupling of said first and second hinge portions forms two circular openings, each one on opposite sides of the portable computer with each one accommodating said speaker.

8. A method, comprising the steps of:
   attaching a cable from a circuit board to a speaker, said speaker emitting sound waves generated by a portable computer, said circuit board accommodating a microprocessor controlling functions of said portable computer;
   covering said speaker with a sleeve made of a resilient material, said sleeve having a portion of a periphery having a concave aperture;
   passing said cable through the aperture of said sleeve;
   inserting said sleeve into a cap having a plurality of apertures on an outer surface allowing sounds from said speaker to emit outwardly;

forming a first hinge portion on a rear side of a bottom portion of a housing, said housing accommodating electronic components for performing functions of said portable computer;

forming a semicircular opening on at least one side of said first hinge portion;

mounting a first periphery of said cap on a surface of said bottom portion;

coupling said bottom portion with said circuit board;

forming a second hinge portion on a rear side of a top portion of said housing, said top portion accommodating an input device and a pointing device;

forming a semicircular opening on at least one side of said second hinge portion;

coupling said bottom portion with said top portion of said housing thereby holding firmly said cap with the semicircular opening of said second hinge portion, a second periphery of said cap being a greater diameter than said first periphery is disposed on the internal section formed by the coupling of said bottom and said top portions; and pivotally attaching a cover of a display screen to said top portion at the second hinge portion, said display screen providing variable video display.

9. The method of claim 8, wherein said cap has a flange formed at the rear edge, said flange has a notch and a pair of ribs formed around the periphery, said pair of ribs being parallel with a space guiding said cable of said speaker in a straight line.

10. The method of claim 9, wherein said first hinge portion has a rib securely supporting a bottom rear surface of said speaker.

11. The method of claim 10, wherein said second hinge portion has a rib securely supporting a top rear surface of said speaker.

12. The method of claim 11, wherein the area of said first hinge portion forming the semicircular opening has a projection, said projection is inserted into said notch of said cap.

13. The method of claim 8, wherein the coupling of said first and second hinge portions forms two circular openings, each one on opposite sides of the portable computer with each one accommodating said speaker.

14. A portable computer comprising:
a lower housing having a first opening on a side surface;
an upper housing having a second opening corresponding to the first opening and coupled to the lower housing to form an internal space; and
a speaker assembly disposed in the internal space and held by the lower housing and the upper housing,
wherein one end surface of the speaker assembly is exposed outwardly through the first opening and the second opening,
wherein the speaker assembly comprises:
a speaker;
a first cap coupled to the speaker and composed of an elastic material; and
a second cap incorporating the first cap and having a plurality of holes on one end surface of the second cap to emit outwardly sound waves generated at the speaker;
wherein a periphery of the second cap is held by the upper housing and the lower housing.

15. The portable computer of claim 14, wherein the second cap includes a first periphery having a first diameter which is disposed at the first opening and the second opening to be held by the surface of the upper housing and the lower housing and a second periphery having a second diameter larger than the first diameter which is tightly contacted with internal surfaces of the upper housing and the lower housing.

16. The portable computer of claim 15, wherein the portable computer includes at least one rib formed in an internal space of the upper housing and the lower housing to support the speaker assembly.

17. The portable computer of claim 16, wherein said speaker assembly being disposed in the internal space and held by the lower housing and the upper housing without additional tools being used.

* * * * *